(12) United States Patent
Liu (10) Patent No.: US 9,489,084 B2
(45) Date of Patent: Nov. 8, 2016

(54) SENSING METHOD AND SENSING APPARATUS FOR SENSING ELECTRODE CLUSTER

(71) Applicant: MStar Semiconductor, Inc., Hsinchu Hsien (TW)

(72) Inventor: Tzu-Wei Liu, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 160 days.

(21) Appl. No.: 14/473,225

(22) Filed: Aug. 29, 2014

(65) Prior Publication Data

US 2015/0061704 A1    Mar. 5, 2015

(30) Foreign Application Priority Data

Aug. 30, 2013    (TW) .............................. 102131401 A (51) Int. Cl.
*G01R 27/08* (2006.01)
*G06F 3/041* (2006.01)
*G06F 3/044* (2006.01)

(52) U.S. Cl.
CPC ............. *G06F 3/0418* (2013.01); *G06F 3/044* (2013.01)

(58) Field of Classification Search
CPC ........ G06F 3/041; G06F 3/044; G06F 3/045; G06F 3/046; G06F 3/0416; G06F 3/0412; G06F 3/0488; G01R 27/02; G01R 27/2605; G01R 27/2611; G01N 27/041; G01N 27/223; G01N 27/226

USPC ........ 324/691, 654, 658, 556; 345/173, 174, 345/168
See application file for complete search history.

(56) References Cited

U.S. PATENT DOCUMENTS

| | | | | |
|---|---|---|---|---|
| 4,999,462 A * | 3/1991 | Purcell | ..................... | G06F 3/044 178/18.03 |
| 6,310,590 B1 * | 10/2001 | Havel | ..................... | G01R 13/26 324/115 |
| 8,692,799 B1 * | 4/2014 | Landry | .................. | G06F 3/0416 345/173 |
| 8,873,743 B1 * | 10/2014 | Peng | ....................... | G06F 3/044 345/173 |
| 9,013,429 B1 * | 4/2015 | Krekhovetskyy | ....... | G06F 3/044 345/173 |
| 2005/0179672 A1 * | 8/2005 | Chiu | ..................... | G06F 3/0213 345/173 |
| 2012/0044204 A1 * | 2/2012 | Hashimoto | ........... | G06F 3/0416 345/174 |
| 2014/0285469 A1 * | 9/2014 | Wright | .................... | G06F 3/044 345/174 |

* cited by examiner

*Primary Examiner* — Son Le
*Assistant Examiner* — Thang Le
(74) *Attorney, Agent, or Firm* — WPAT, PC; Justin King; Jonathan Chiang (57) ABSTRACT

A sensing method for a sensing electrode cluster is provided. The sensing electrode cluster includes a plurality of groups, each comprising a plurality of bars. The sensing method includes scanning each of the groups according to a first scanning sequence, and scanning each of the groups according to a second scanning sequence, and determining a sensing position according to the first position and the second position. The first scanning sequence is different from the second scanning sequence.

15 Claims, 13 Drawing Sheets

SENSING METHOD AND SENSING APPARATUS FOR SENSING ELECTRODE CLUSTER

This application claims the benefit of Taiwan application Serial No. 102131401, filed Aug. 30, 2013, the subject matter of which is incorporated herein by reference.

BACKGROUND OF THE INVENTION

1. Field of the Invention

The invention relates in general to a touch panel, and more particularly, to a sensing apparatus and a sensing method for a sensing electrode cluster on a touch panel.

2. Description of the Related Art

Touch panels make a large scale industry. Various electronic products adopt touch panels as critical input/output devices for human-machine interfaces. The performance of touch panels depends on sensing electrodes and logic circuits connected thereto. Thus, the design and quality of the sensing electrodes dominates the performance of touch panels.

The sensing electrodes of a touch panel are generally formed on a transparent substrate. Light emitted from a display device penetrates the transparent substrate to reach a user. These sensing electrodes formed on the transparent substrate include multiple electrodes, which are connected to the logic circuits via multiple conducting wires.

With the constant increase resolution demand of display devices, the performance requirements of touch panels also become higher. To provide better performances including the resolution, precision, sensing speed for fast-moving objects for touch devices, more electrodes and conducting wires need to be fit into a limited touch area.

One drawback of current touch panels is that, when a proximity object draws a line back and forth with a fast speed, points sensed by a sensing apparatus are presented as ripples or waves instead of a straight line.

Therefore, there is a need for a good sensing apparatus and associated sensing method for minimizing errors in a reported proximity point to have a result of the reported points display a straight line.

SUMMARY OF THE INVENTION

According to an embodiment of the present invention, a sensing method for a sensing electrode cluster is provided. The sensing electrode cluster includes a plurality of groups, each comprising a plurality of bars. The sensing method includes scanning each of the groups according to a first scanning sequence, and scanning each of the groups according to a second scanning sequence, and determining a sensing position according to the first position and the second position. The first scanning sequence is different from the second scanning sequence.

According to another embodiment of the present invention, a sensing apparatus operating with at least one sensing electrode cluster is provided. The the sensing electrode cluster includes a plurality of groups, each comprising a plurality of bars. The sensing apparatus includes a scanning module and a calculation module. The scanning module scans each of the groups according to a first scanning sequence, and scans each of the groups according to a second scanning sequence. The calculation module generate a first position and a second position according to scanning results of the first scanning sequence and the second scanning sequence, respectively, and to generate a sensing position according to the first position and the second position. The first scanning sequence is different from the second scanning sequence.

In conclusion, a main spirit of the present invention is to scan the bars of a same group for multiple number of times before reporting points each time. Thus, a scanning rate is increased to reduce ripples or waves generated when reporting the points.

The above and other aspects of the invention will become better understood with regard to the following detailed description of the preferred but non-limiting embodiments. The following description is made with reference to the accompanying drawings.

DETAILED DESCRIPTION OF THE INVENTION

Embodiments of the present invention are described in detail below. Apart from the disclosed embodiments, the present invention is also applicable to other embodiments. The scope of the present invention is not limited by the embodiments, and is defined in accordance with the appended claims. To better describe the contents of the present invention to one person skilled in the art and to keep the drawings clear, certain sizes and other associated scales may be emphasized to appear exaggerated, with unrelated details not entirely depicted.

Figure 1:
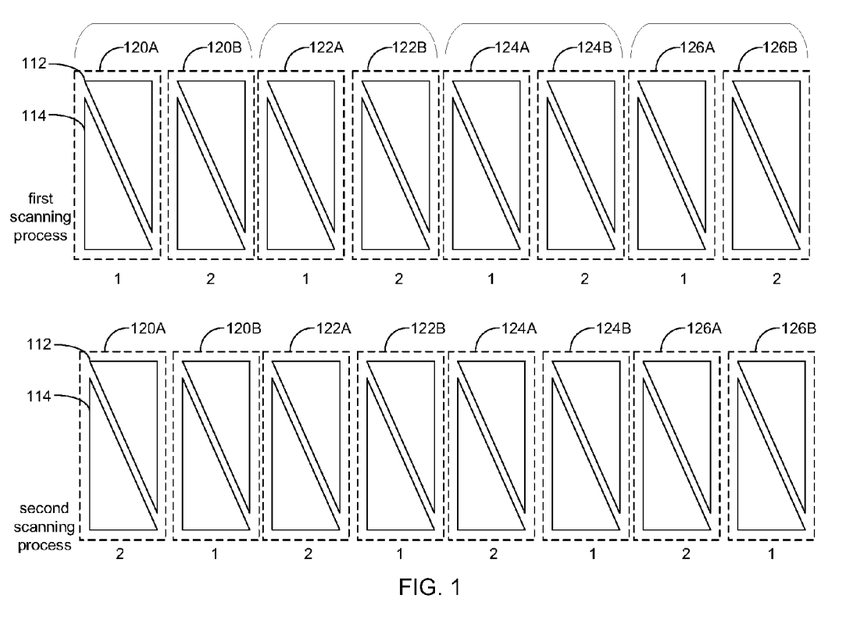
FIG. 1 is a schematic diagram of a sensing electrode cluster and its scanning sequence according to an embodiment of the present invention.

FIG. 1 shows a schematic diagram of a sensing electrode cluster and its scanning sequence according to an embodiment of the present invention. A touch panel may include only one or a plurality of sensing electrode clusters. Referring to an upper part of FIG. 1, an electrode 112 and an electrode 114 are a pair of corresponding electrodes, and may have planar contours of a triangle, a triangle-like trapezoid, or a polygon. The electrodes 112 and 114 form a bar 120A. Similarly, seven other bars 120B, 122A, 122B,

124A, 124B, 126A and 126B are depicted in FIG. 1. Every two bars form a group, and are connected to a sensing unit of the sensing electrode cluster. As such, the embodiment in FIG. 1 includes four groups each including two bars respectively denoted A and B (hereinafter "A" bar and "B" bar, e.g. the bar 120A and the bar 120B.). As the bars of the same group utilize a same wire, the bars in the same group need to be separately scanned in a time-division manner.

In sensing apparatuses according to the prior arts, before reporting detected points, the bars of the same group are only scanned once. When an object coming to the proximity moves at a fast speed, the object may have already moved to a different position while the bars of the same group are still being scanned. On top of geometric effects of the electrodes 112 and 114, ripples or waves are likely generated when reporting the points. One main spirit of the present invention is to scan the bars of the same group for a multiple number of times before each time reporting the points. Thus, a scanning rate is increased to reduce ripples or waves generated when reporting the points.

In the first scanning process shown in the upper part of FIG. 1, the sensing apparatus first scans and senses the "A" bars of the groups, and then scans and senses the "B" bars of the groups. A number below each bar represents a scanning sequence of the bar in the group. In the first scanning process, the numbers below the "A" bars are 1, and the numbers below the "B" bars are 2. When the first scanning process is complete, the scanning apparatus may generate a first position according to a result of scanning and sensing.

Similarly, during a second scanning process shown in the lower part of FIG. 1, the sensing apparatus f first scans and senses the "B" bars of the groups, and then scans and senses the "A" bars of the groups. The number below each bar represents the scanning sequence of the bar in the group. In the second scanning process, the numbers below the "A" bars are 2, and the numbers below the "B" bars are 1. When the second scanning process is complete, the sensing apparatus may generate a second position according to a result of scanning and sensing.

Next, the sensing apparatus generates a sensing position according to coordinates of the first position and the second position, and reports the sensing position to an operating system or other software or hardware. For example, the coordinate of the sensing position may be a simple average or a weighted average of the coordinates of the first position and the second position. As such, with the increased scanning rate, ripples or waves generated when reporting the point can be reduced.

Figure 2A:
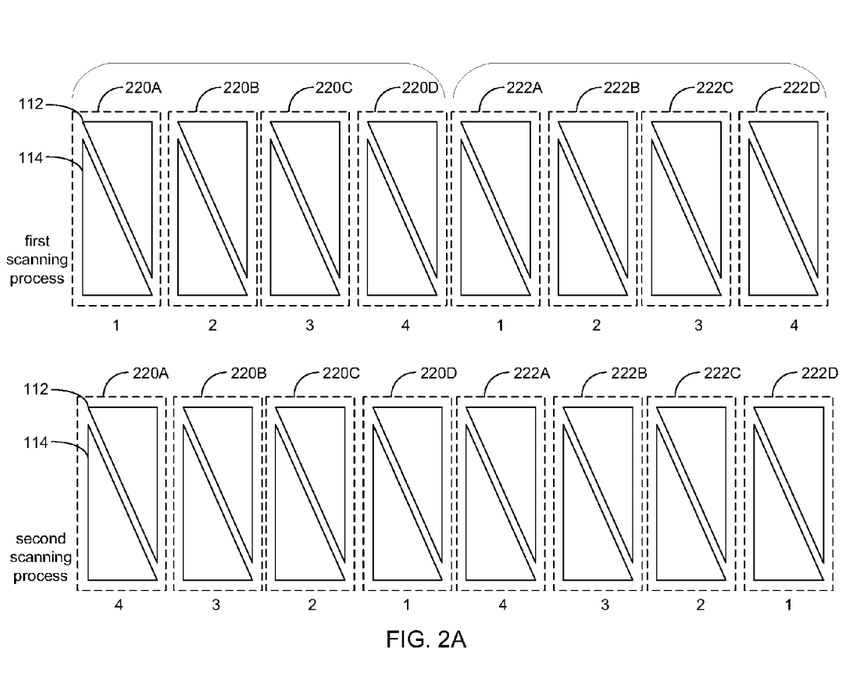
FIG. 2A is a schematic diagram of a sensing electrode cluster and its scanning sequence according to another embodiment of the present invention.

FIG. 2A shows a schematic diagram of a sensing electrode cluster and its scanning sequence according to another embodiment of the present invention. Different from FIG. 1, the groups in FIG. 2A respectively include four bars. The group at the left includes bars 220A to 220D, and the group at the right includes bars 222A to 222D. Similarly, as the bars of the same group are share a wire connected to a sensing apparatus, the bars of the same group can only be performed in a time-division manner within one scanning process.

As shown in the upper part of FIG. 2A, in the embodiment, the first scanning process is performed from the left to the right. In other words, the bars 220A and 222A are the first to be scanned, the bars 220B and 222B are the second to be scanned, the bars 220C and 222C are the third to be scanned, and the bars 220D and 222D at the rightmost of the groups are the last to be scanned. As shown in the lower part of the FIG. 2A, the second scanning process is performed in a reverse order of the first scanning process, i.e., from the right to the left. In other words, the bars 220A and 222A are the fourth to be scanned, the bars 220B and 222B are the third to be scanned, the bars 220C and 222C are the second to be scanned, and the rightmost of the groups are the first to be scanned. A sum of the numbers denoting the sequences of the first scanning process and the second scanning process of each bar is equal to 5. For example, the number of the sequence of the bar 220A in the first scanning process is 1, and the number of the sequence of the bar 220A in the second scanning process is 4, with the two numbers adding up to 5. The same applies to the other bars.

Figure 2B:
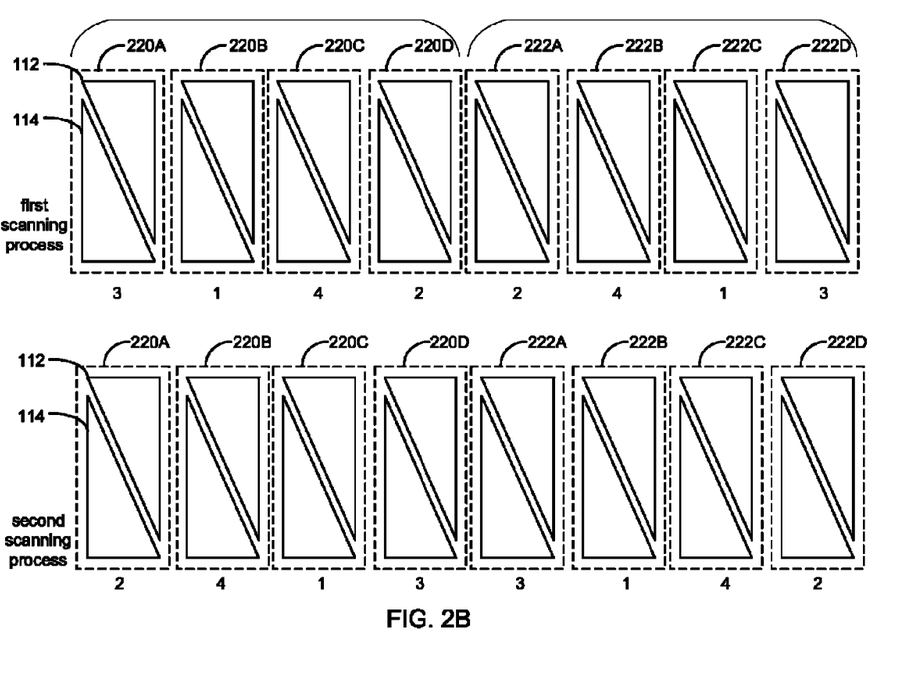
FIG. 2B is a schematic diagram of a sensing electrode cluster and its scanning sequence according to another embodiment of the present invention.

FIG. 2B shows a schematic diagram of a sensing electrode cluster and its scanning sequence according to another embodiment of the present invention. A difference between FIG. 2B and FIG. 2A is that, the scanning sequence of the groups may be different in the first or second scanning process. For example, in the first scanning process, the scanning sequence of the left group from the left to the right is sequentially 3, 1, 4 and 2, and the scanning sequence of the right group from the left to the right is 2, 4, 1 and 3. In the second scanning process, the scanning sequences of the groups are the reverse of the first scanning process. For example, for the second scanning process, the scanning sequence of the left group from the left to the right is 2, 4, 1 and 3, and the scanning sequence of the right group from the left to the right is 3, 1, 4 and 2. That is, a sum of the numbers of the scanning sequences of the first scanning process and the second scanning process for each bar is equal to 5.

Figure 2C:
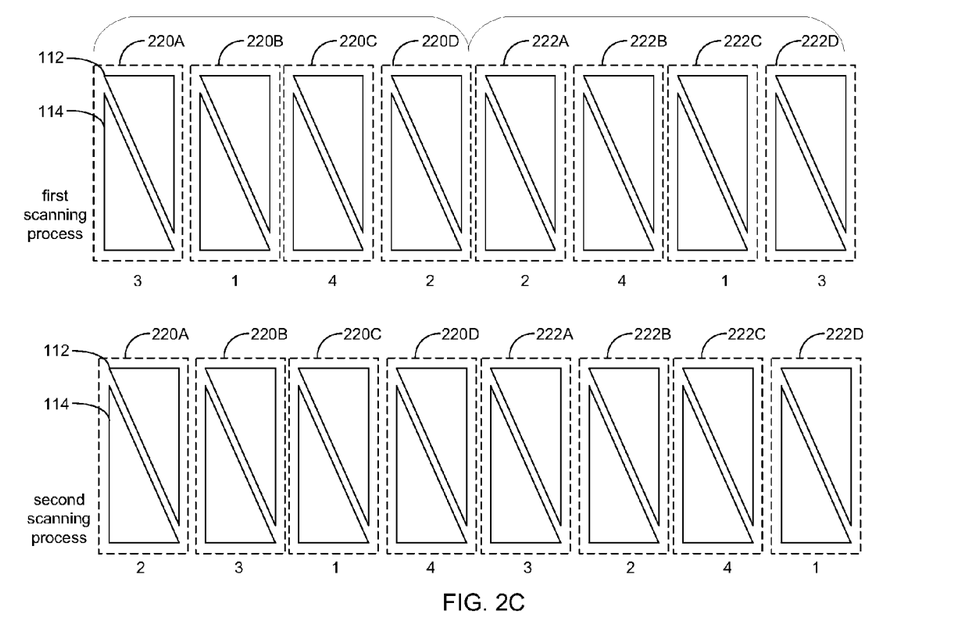
FIG. 2C is a schematic diagram of a sensing electrode cluster and its scanning sequence according to another embodiment of the present invention.

FIG. 2C shows a schematic diagram of a sensing electrode cluster and its scanning sequence according to another embodiment of the present invention. A difference of FIG. 2C from FIG. 2A and FIG. 2B is that, in the first scanning process or the second scanning process, the scanning sequences of the two scanning processes are not limited to a reverse sequences. In other words, a sum of the numbers of the sequences of the first scanning process and the second scanning process of each bar is not necessarily equal to 5. For example, the sequence of the bar 220B is 1 in the first scanning process and is 3 in the second scanning process, adding up to a total of 4. For another example, the sequence of the bar 222B is 4 in the first scanning process and 2 in the second scanning process, adding up to a total of 6. Thus, it is known that the sequences of the two scanning processes are not limited to being related.

Figure 2D:
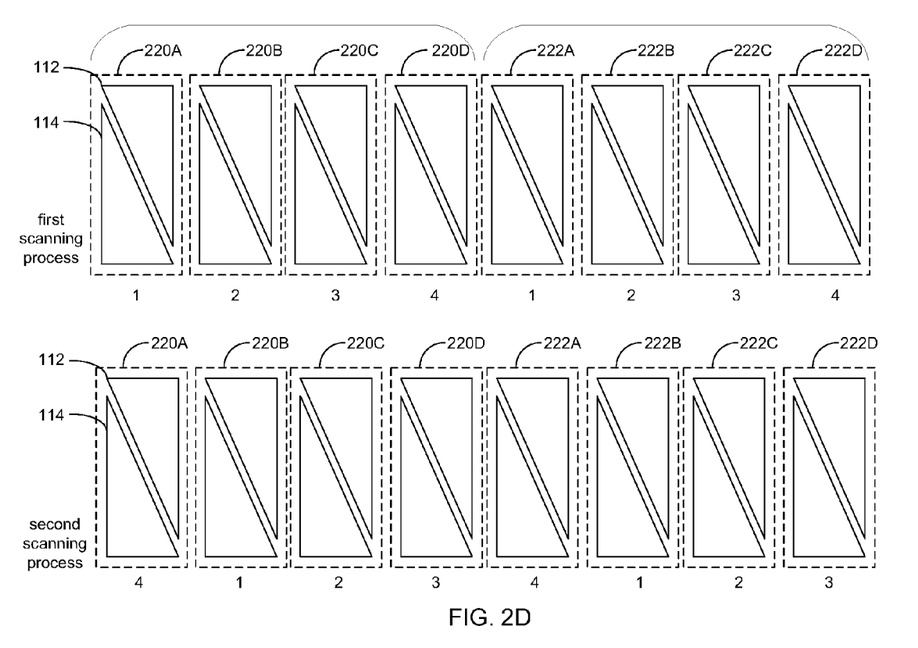
FIGS. 2D and 2E are schematic diagram of a sensing electrode cluster and its scanning sequence according to another embodiment of the present invention.
Figure 2E:
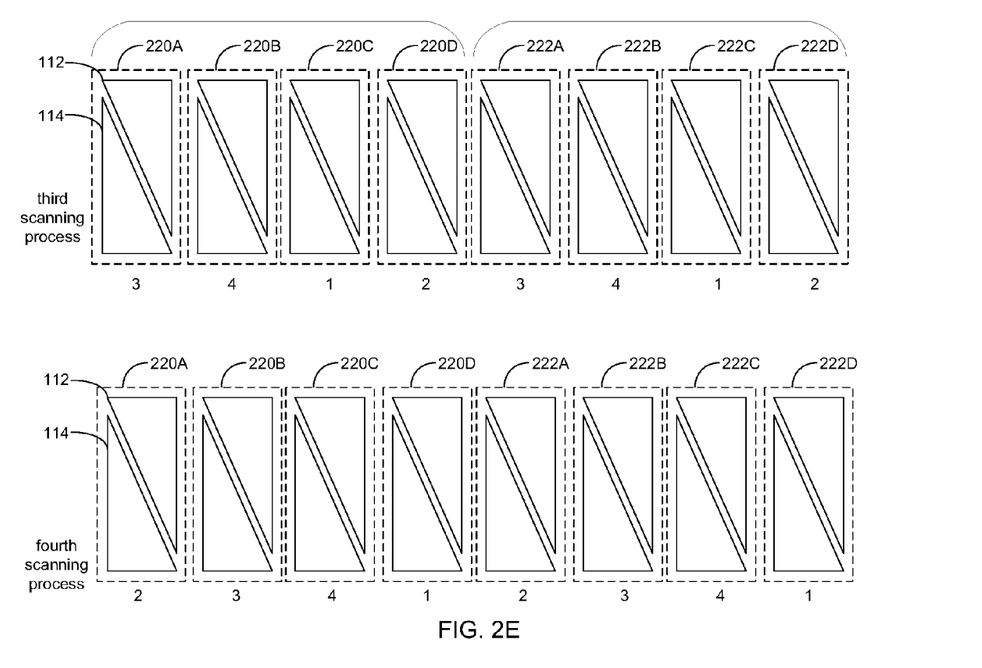

FIG. 2D and FIG. 2E are schematic diagrams of a sensing electrode cluster and its scanning sequence according to another embodiment of the present invention. Different from the previous embodiments, in this embodiment, in addition to two scanning processes, a third scanning process and a fourth scanning process are further performed before reporting points. As such, a third position and a fourth position can be obtained, respectively, and a sensing position when reporting points is an average of the first position to the fourth position. A person skilled in the art can appreciate that, given two or more scanning processes are performed, the scanning sequence before reporting points each time is not limited.

Figure 3:
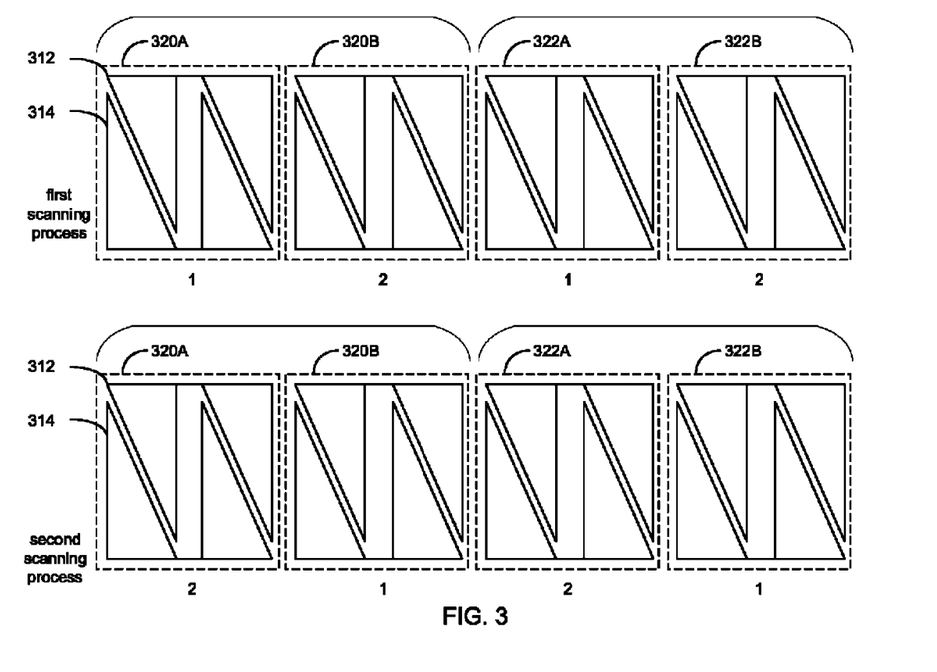
FIG. 3 is a schematic diagram of a sensing electrode cluster and its scanning sequence according to another embodiment of the present invention.

FIG. 3 shows a schematic diagram of a sensing electrode cluster and its sensing sequence according to another embodiment of the present invention. A difference of FIG. 3 from FIG. 1 and FIG. 2A to 2E is that, each bar includes multiple corresponding electrode pairs. For example, a bar 320A includes corresponding electrodes 312 and 314. The electrode 312 includes two triangular, triangle-like trapezoidal or polygonal electrodes. The corresponding electrode 314 includes two triangular, triangle-like trapezoidal or polygonal electrodes. A person skilled in the art can understand that shapes and numbers of electrodes are not limited by the present invention. In the embodiment in FIG. 3, two scanning processes/sequences are the same as those of the embodiment in FIG. 1.

Figure 4A:
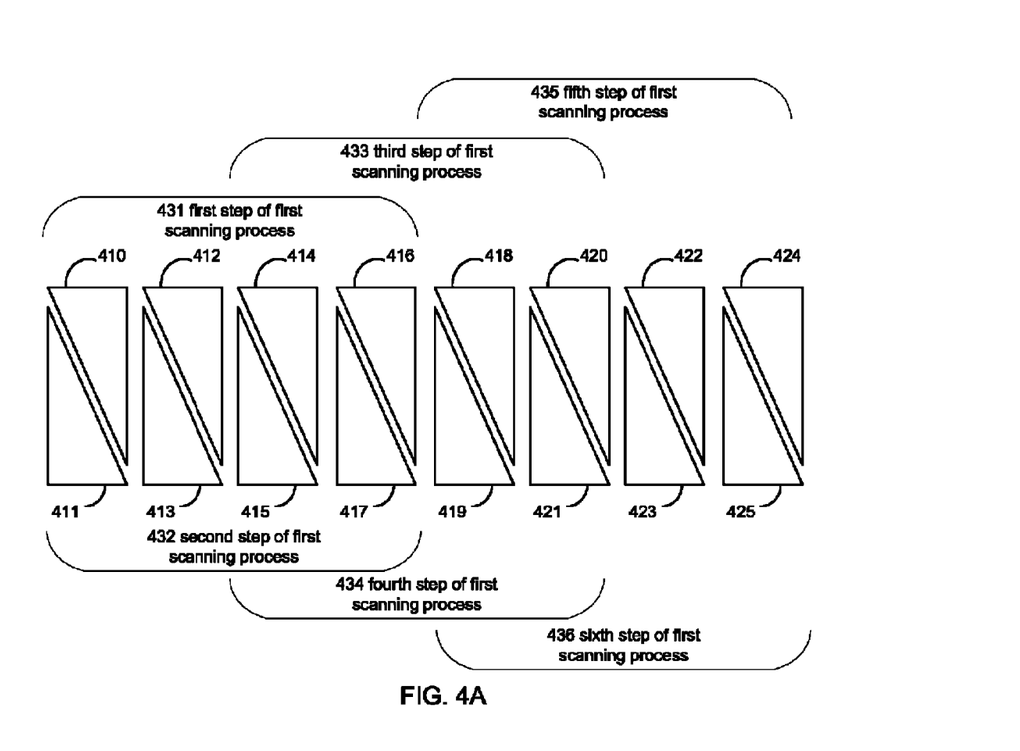
FIG. 4A and FIG. 4B are schematic diagrams of a sensing electrode cluster and its scanning sequence according to another embodiment of the present invention.
Figure 4B:
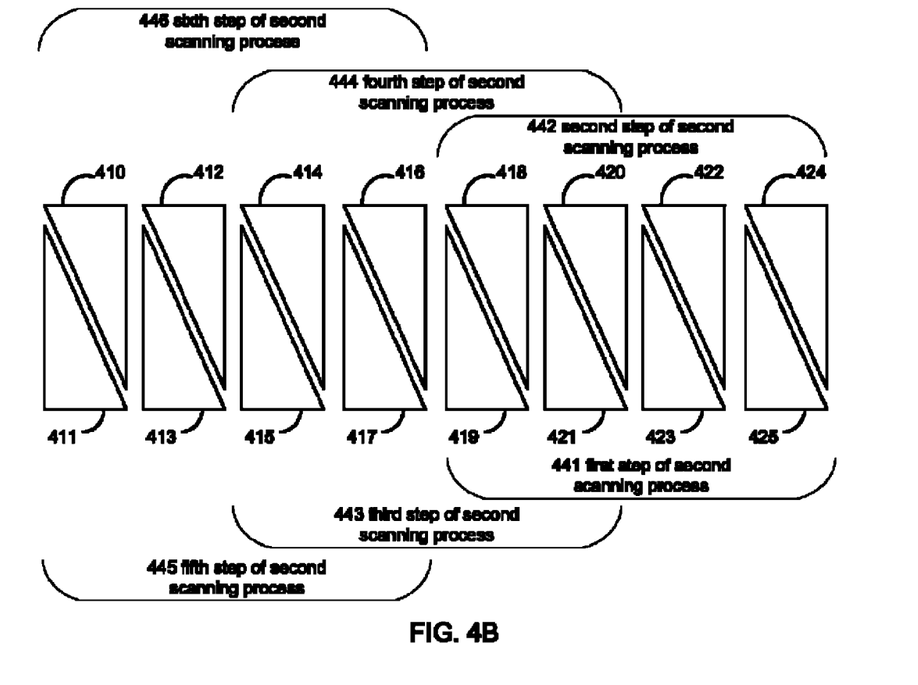

FIG. 4A and FIG. 4B are schematic diagrams of a sensing electrode cluster and its scanning sequence according to another embodiment of the present invention. A main difference of the embodiment in FIG. 4A and FIG. 4B from the previous embodiments is that, instead of utilizing bars as a unit for scanning as in the previous embodiments, electrodes at the same side are utilized as a unit for scanning in the embodiment in FIG. 4A and FIG. 4B. All of the electrodes scanned in a first scanning process and a second scanning process can be regarded as one group in these embodiments.

As shown in FIG. 4A, a sensing electrode cluster includes 16 electrodes 410 to 425. The even-numbered electrodes are located at one side, and the odd-numbered electrodes are located at the other side. In the embodiment, steps 431 to 436 are performed in the first scanning process. Each of the steps scans the four electrodes at one side, and filters out common mode noises by utilizing differences between signal values of adjacent electrodes after obtaining the scanned signal values. In step 431, the four electrodes 410, 412, 414 and 416 at the upper side are scanned. In step 432, the four electrodes 411, 413, 415 and 417 at the lower side are scanned. The scanning sequences is similarly continued until step 436 is performed, thus completing the first scanning process. The signal values of all of the electrodes are obtained after completing the first scanning process, and differences between the signal values of the adjacent electrodes are obtained. As such, in the event of an object coming into the proximity of the sensing electrode cluster, the first position of the proximity point can be calculated.

As shown in FIG. 4B, the second scanning process is performed. In the embodiment, the sequence of performing the steps of the second scanning process is the reverse of the sequence of performing the steps of the first scanning process. Thus, in step 441 corresponding to step 436, scanning is performed to obtain scanned signal values and/or differences of the electrode 419, 421, 423 and 425. Steps 442 to 446 are sequentially performed. Similarly, the signal values of all of the electrodes as well as the differences between the signal values of the adjacent electrodes are obtained. As such, in the event of an object coming into the proximity of the sensing electrode cluster, the second position of the proximity point can be calculated. The first position and the second position are averaged to obtain the sensing position.

Figure 4C:
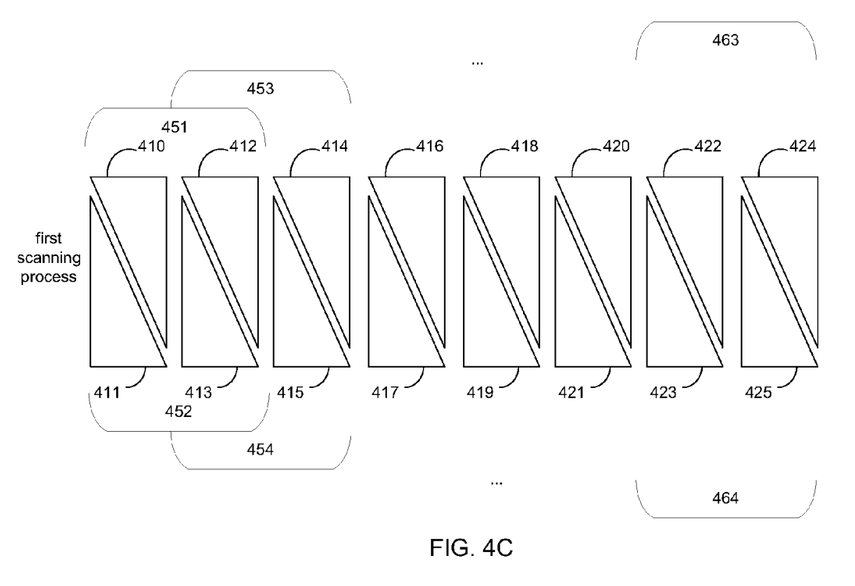
FIG. 4C and FIG. 4D are schematic diagrams of a sensing electrode cluster and its scanning sequence according to another embodiment of the present invention.
Figure 4D:
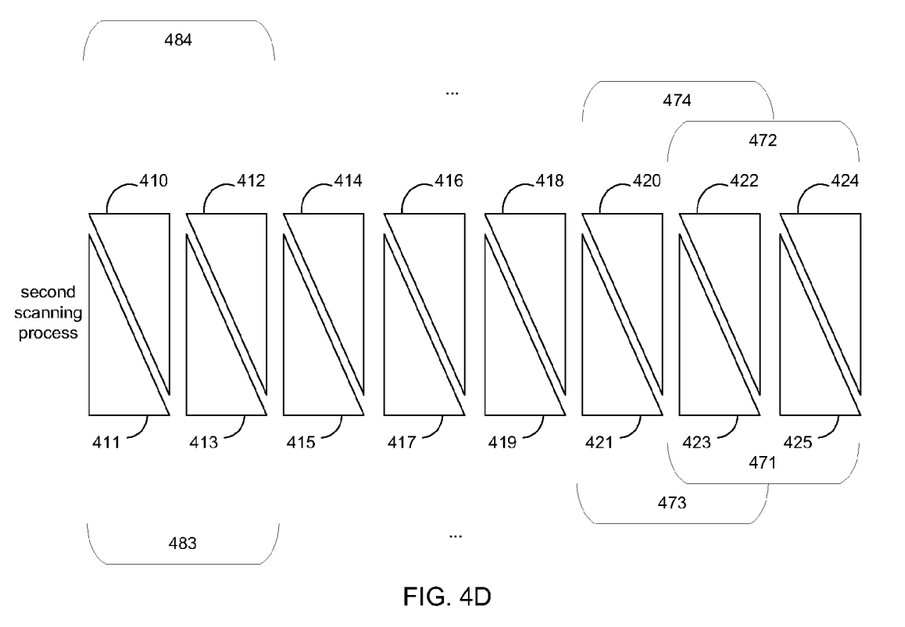

FIG. 4C and FIG. 4D are schematic diagrams of a sensing electrode cluster and its scanning sequence according to another embodiment of the present invention. A main difference of the embodiment from the embodiment in FIG. 4A and FIG. 4B is that, 14 steps 451 to 464 and 471 to 484 are performed in two scanning processes of this embodiment. In each scanning step, only two adjacent electrodes at the same side are scanned. A person skilled in the art can understand that, the number of electrodes scanned in each scanning step is determined by hardware of a scanning module of a sensing apparatus. It is to be noted that, the number of scanning steps, the number of scanned electrodes and the sequence of scanned electrodes of each scanning process are not limited by the present invention. Particularly, the electrodes at upper and lower sides are not limited to being scanned in a staggered manner. Given two positions are obtained in two scanning processes and the two obtained positions are averaged, the sensing position obtained is capable of effectively mitigating the occurrence of ripples or waves.

Figure 5:
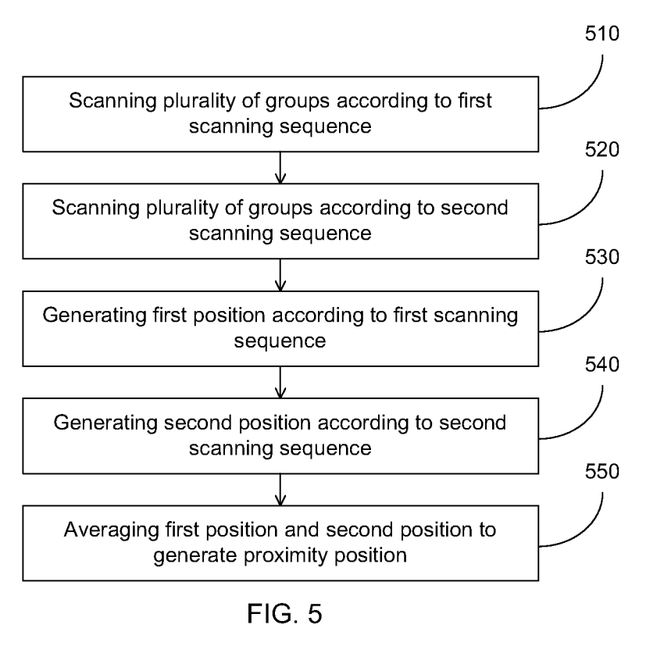
FIG. 5 is a flowchart of a sensing method according to an embodiment of the present invention.

FIG. 5 shows a flowchart of a sensing method according to an embodiment of the present invention. Unless causality between steps is otherwise mentioned, the sequence of the steps in FIG. 5 is not limited herein. The sensing method in FIG. 5 may be applied to the previously described embodiments, and particularly to the sensing apparatus for a sensing electrode cluster. The sensing method includes the following steps.

In step 510, a plurality of groups are scanned according to a first scanning sequence.

In step 520, the plurality of groups are scanned according to a second scanning sequence. The first scanning sequence is different from the second scanning sequence, and may be a reverse sequence of the second scanning sequence.

In step 530, a first position is generated according to the first scanning sequence. Step 530 may be performed before step 520, simultaneously with step 520, or after step 520. In other words, the sequence of the two steps is not limited.

In step 540, a second position is generated according to the second scanning sequence.

In step 550, the first position and the second position are averaged to generate a sensing position.

Figure 6:
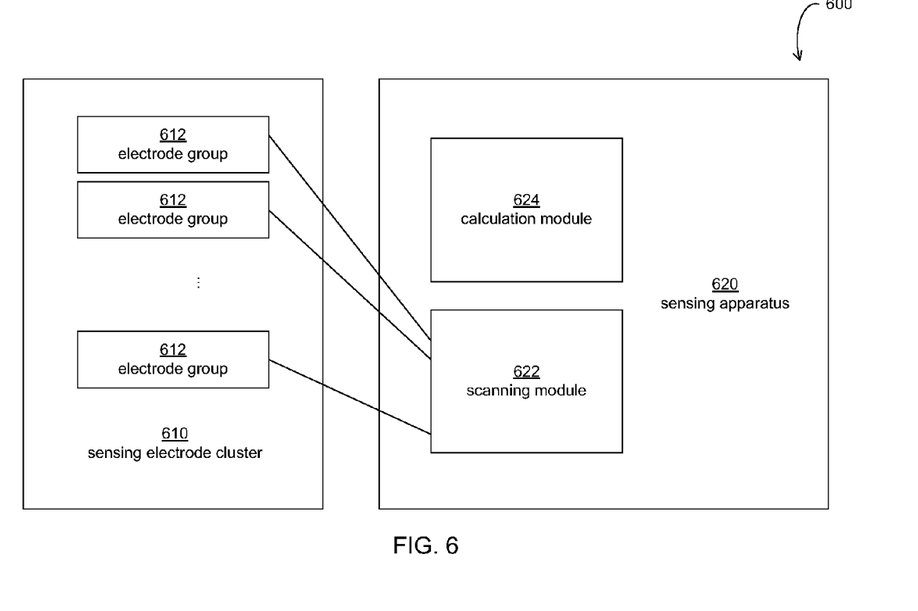
FIG. 6 is a schematic diagram of a sensing system according to an embodiment of the present invention.

FIG. 6 shows a schematic diagram of a sensing system 600 according to an embodiment of the present invention. The sensing system 600 includes at least one sensing electrode cluster 610 and a sensing apparatus 620. The sensing electrode cluster 610 may be formed on a substrate, with specific details omitted herein. The sensing electrode cluster 610 may include multiple electrode groups 612, each of which includes at least one bar including a plurality of electrodes. For example, each of the electrode groups 612 may include the bar 120A and 1206 in FIG. 1, the bars 220A to 220D in the embodiment in FIG. 2A, or the bars 320A and 320B in the embodiment in FIG. 3. For another embodiment, the only electrode group 612 may include the electrodes 410 to 425 in the embodiment in FIG. 4A to 4D.

The sensing apparatus 620 includes a scanning module 622 and a calculation module 624, and is applicable to the flowchart in FIG. 5. The scanning module 622, connected to the electrode groups 612 of the sensing electrode cluster 610, performs the foregoing steps 510 and 520. The calculation module 624, connected to the scanning module 622, performs the foregoing steps 530 to 550. Since the two modules 622 and 624 individually perform scanning and calculation, the scanning steps 510 and 520 may be simultaneously performed with the calculation steps 530 and 540.

In conclusion, one main spirit of the present invention is to perform multiple scanning processes on the bars of the same group before reporting points each time. As such, the scanning rate is increased to reduce ripples or waves generated when reporting the points.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sensing method for a sensing electrode cluster, the sensing electrode cluster comprising a plurality of groups, each comprising a plurality of bars, the sensing method comprising:

scanning each of the groups according to a first scanning sequence to generate a first position;

scanning each of the groups according to a second scanning sequence to generate a second position; and determining a sensing position according to the first position and the second position;

wherein the first scanning sequence is different from the second scanning sequence.

2. The sensing method according to claim 1, wherein the first scanning sequence is a reverse sequence of the second scanning sequence.

3. The sensing method according to claim 1, wherein each of the group comprises a plurality of electrodes at two sides, and the step of scanning according to the first scanning sequence and the second scanning sequence comprises respectively performing scanning on the electrodes at different sides in a staggered manner according to the first scanning sequence and the second scanning sequence.

4. The sensing method according to claim 3, wherein the first scanning sequence and the second scanning sequence comprise a plurality of steps, each comprising scanning a plurality of electrodes at one side, and each two sequential steps scanning the plurality of electrodes at the same side comprises scanning at least one same electrode.

5. The sensing method according to claim 1, wherein each of the bar comprises at least one electrode pair.

6. The sensing method according to claim 5, wherein planar contours of a half of the at least one electrode pair comprises one of:

a triangle;

a triangle-like trapezoid; and a polygon.

7. A sensing apparatus operating with at least one sensing electrode cluster, the sensing electrode cluster comprising a plurality of groups, each comprising a plurality of bars, the sensing apparatus comprising:

a scanning module, configured to scan each of the groups according to a first scanning sequence and to scan the each of the groups according to a second scanning sequence; and a calculation module, coupled to the scanning module, configured to generate a first position and a second position according to scanning results of the first scanning sequence and the second scanning sequence, respectively, and to generate a sensing position according to the first position and the second position;

wherein, the first scanning sequence is different from the second scanning sequence.

8. The sensing apparatus according to claim 7, wherein the first scanning sequence is a reverse sequence of the second scanning sequence.

9. The sensing apparatus according to claim 7, wherein generating the first position by the calculation module is performed before scanning according to the second scanning sequence.

10. The sensing apparatus according to claim 7, wherein each of the groups comprises a plurality of electrodes at two sides, and the scanning module respectively performing scanning on the electrodes at different sides in a staggered manner according to the first scanning sequence and the second scanning sequence.

11. The sensing apparatus according to claim 10, wherein the first scanning sequence and the second scanning sequence comprise a plurality of steps, each comprising scanning a plurality of electrodes at one side, and each two sequential steps scanning the plurality of electrodes at the same side comprises scanning at least one same electrode.

12. The sensing apparatus according to claim 7, wherein each of the bar comprises at least one electrode pair.

13. The sensing apparatus according to claim 12, wherein planar contours of a half of the at least one electrode pair comprises one of:

a triangle;

a triangle-like trapezoid; and a polygon.

14. The sensing method according to claim 1, wherein the sensing position comprises a first coordinate position.

15. The sensing apparatus according to claim 7, wherein the sensing position comprises a first coordinate position.

* * * * *